US005793038A

United States Patent [19]

Buttrill, Jr.

[11] Patent Number: 5,793,038

[45] Date of Patent: Aug. 11, 1998

[54] METHOD OF OPERATING AN ION TRAP MASS SPECTROMETER

[75] Inventor: Sidney E. Buttrill, Jr., Palo Alto, Calif.

[73] Assignee: Varian Associates, Inc., Palo Alto, Calif.

[21] Appl. No.: 763,964

[22] Filed: Dec. 10, 1996

[51] Int. Cl.$^6$ .............................. B01D 59/44; H01J 49/00

[52] U.S. Cl. .............................................. 250/282; 250/292

[58] Field of Search ...................................... 250/282, 292

[56] References Cited

U.S. PATENT DOCUMENTS

| | | | |
|---|---|---|---|
| 2,939,952 | 6/1960 | Paul et al. | 250/41.9 |
| 2,950,389 | 8/1960 | Paul et al. | 250/41.9 |
| 3,527,939 | 9/1970 | Dawson et al. | 250/41.9 |
| 4,540,884 | 9/1985 | Stafford et al. | 250/282 |
| 4,736,101 | 4/1988 | Syka et al. | 250/292 |
| 4,761,545 | 8/1988 | Marshall et al. | 250/291 |
| 5,134,286 | 7/1992 | Kelley | 250/282 |
| 5,198,665 | 3/1993 | Wells | 250/282 |
| 5,300,772 | 4/1994 | Buttrill, Jr. | 250/282 |
| 5,396,064 | 3/1995 | Wells | 250/282 |
| 5,448,061 | 9/1995 | Wells | 250/292 |
| 5,449,905 | 9/1995 | Hoekman et al. | 250/292 |
| 5,521,380 | 5/1996 | Wells | 250/292 |

FOREIGN PATENT DOCUMENTS

| | | | |
|---|---|---|---|
| 0 362 432 | 4/1990 | European Pat. Off. | H01J 49/42 |
| 0 362 432 A1 | 11/1990 | European Pat. Off. | H01J 49/42 |

OTHER PUBLICATIONS

Article by Raymond E. March and Richard J. Hughes, entitled "Quadrupole Storage Mass Spectrometry", published in *vol. 102 in Chemical Analysis: A Series of Monographs on Analytical Chemist and its Applications* in 1989.

March et al., *Quadrupole Storage Mass Spectrometry*, Wiley–Interscience Publications., New York, 1989.

*Primary Examiner*—Bruce Anderson
*Attorney, Agent, or Firm*—Bella Fishman

[57] ABSTRACT

A method of operating a quadrupole ion trap as a mass spectrometer, in which the ion mass to be detected is selected by adjusting the three dimensional quadrupole storage field to make the $\beta_z$ value of the selected mass equal to a fixed, predetermined $\beta_z$ value of a narrow range of frequencies excluded from a broadband supplemental RF electric field. The ions are detected to provide a signal corresponding to the amount of the selected ion mass.

16 Claims, 3 Drawing Sheets

METHOD OF OPERATING AN ION TRAP MASS SPECTROMETER

FIELD OF THE INVENTION

This invention relates to mass spectrometry methods of measuring the amount of a specific compound or element present in a mixture or sample, and more particularly to a method of operating an ion trap mass spectrometer to perform measurements of the number of ions of a particular mass.

BACKGROUND OF THE INVENTION

Conventional mass spectrometry techniques use ion traps for storing and manipulating ions. A schematic illustration of a typical quadrupole ion trap device is shown in FIG. 1. It is constructed of three electrodes: ring electrode 10 and a pair of respective upper and lower end cap electrodes 11 and 12. The shape and arrangement of these electrodes are designed so as to establish a rotationally symmetrical quadrupolar electric field when appropriate radio frequency (RF) voltage having electrical potentials are applied thereto. The RF quadrupole electric field is usually produced by applying the output of an RF power supply 34 to ring electrode 10. Ions may be trapped within this field and held for subsequent mass analysis or further manipulation. In common techniques, either ions or ionizing means, such as a beam of electrons, enter the trap through opening 13 in upper end cap 11. During mass analysis, ions exiting the trap through opening 14 in lower end cap 12 enter ion detector 20, which can be, for example, a continuous dynode electron multiplier.

The ion trap for separating charged particles was first described by Paul and Steinwedel (U.S. Pat. No. 2,939,952), who later disclosed the technique of separating ions by applying an additional frequency or frequencies to selectively remove specific undesired ions from the trap (U.S. Pat. No. 2,950,389).

The theory of operation of the ion trap is described in details in the Paul et al., patents and in the book *Quadrupole Storage Mass Spectrometry* by Raymond E. March and Richard J. Hughes, Wiley-Interscience Publications, New York, 1989. According to this theory, ions of a selected mass range are stored within a quadrupole electric field which contains an RF component. It is a property of such a quadrupole potential that ions are stably trapped only under certain conditions which depend on the mass of the ions, the amplitude and frequency of the RF and DC potentials, and the physical dimensions of the trap. This complex relationship is usually described in terms of a stability diagram of the type shown in FIG. 2. The values of the dimensionless parameters a and q are given by:

$$a = \frac{-8eU}{mr_0^2\Omega^2}$$

and $$q = \frac{4eV}{mr_0^2\Omega^2},$$

where e and m are the charge and mass of the ion respectively,

U is the DC potential,

V and $\Omega$ are the amplitude and angular frequency of the RF potential, and $r_0$ is the radius of the ring electrode, a characteristic dimension of the trap electrodes.

Ions are stable in the trap if their values of a and q place them within the enclosed part of the stability diagram in FIG. 2.

Dawson taught the ion trap could be operated as a mass spectrometer (U.S. Pat. No. 3,527,939). Dawson stored ions of a single mass in the trap by adjusting the values of parameters a and q for the desired ion to lie in either the upper A or lower B corners of the stability diagram, as shown in FIG. 2. If the operating point is close enough to the apex, then only one ion mass will remain within the stability diagram. Ions of higher mass will lie outside the stability diagram on the left side and ions of lower than the desired mass will lie outside of the stability diagram on the right side of the apex. The number of ions of the single stored mass is detected by applying a DC voltage pulse to one of the end cap electrodes so that the ions exit through opening 14 and enter ion detector 20. Dawson's method allowed the use of external ion multipliers as a detector to improve the sensitivity of detecting the ion signal.

An alternative method of storing only a selected ion mass within the ion trap relies on the periodic nature of the ion motion within the ion trap. Paul et al. in the U.S. Pat. No. 2,950,389 suggested to use resonant ejection of unwanted ions from the ion trap since the motion of a trapped ion may be described by a series of superimposed oscillations. For most of the region within the stability diagram, the lowest frequency component of this motion has the largest amplitude and its frequency is given by:

$$\omega_u = \frac{\beta_u\Omega}{2},$$

where u refers to either the z or r directions, $\beta$ is a parameter which depends on a and q and is plotted on the stability diagram in FIG. 2.

The motion in the z and r directions are independent of each other because of the symmetry of the quadrupole field. In practice this means that ion motion in the z direction may be excited without significantly increasing the amplitude of the oscillations in the r direction. The detailed theory of ion motion in the ion trap is described by Paul et al. and in the book by March and Hughes.

Another technique of mass analyzing a sample was disclosed by Franzen et al., in the European Patent Application 0 362 432. Franzen et al., teach that a broadband RF excitation voltage which comprises the secular frequencies of all unwanted ions can be applied during, and for a short period of time after the ionization, in order to selectively store only desired ion masses. This provides an alternative to the method of Dawson for storing a single ion mass in the ion trap, and has the advantage of considerably greater efficiency.

The widespread use of ion traps as mass spectrometers, however, did not occur until the development by Stafford of the consecutive mass instability scanning mode of operation (Stafford et al., in U.S. Pat. No. 4,540,884). This was followed by the improvement known as axial modulation in which a dipolar RF electric field was applied across the ion trap end caps during the mass scan (Syka et al., U.S. Pat. No. 4,736,101). These developments made the ion trap a highly sensitive and rapid scanning mass spectrometer. A wide range of ion masses is accumulated in the trap and then scanned out one mass at a time into an ion detector to provide a mass spectrum. In the commercial versions of the ion trap mass spectrometer, a DC voltage is not normally present. As a result all ions have a=0 and fall on the line labeled as the "Normal Scan Line" in the stability diagram.

A mass spectrum may be recorded by filling the trap with ions, then raising the amplitude of the storage RF voltage causing the ions to become unstable in the z direction. On the stability diagram, ions move along the "Normal Scan Line" from left to right until they cross the $\beta$=1.0 line at q=0.908 and enter the region of z-axis instability.

In the commercial ion traps utilizing the prior art techniques, all of the ions in the mass range of interest and often other masses as well are accumulated at the same time. The amplitude of the storage RF voltage is then increased smoothly to cause the ions to become unstable, one mass at a time, in order of increasing mass. This techniques provides high detection sensitivity for all masses. However, because all masses are trapped simultaneously, the probability of trapping a specific ion mass is influenced by the number of ions with different masses trapped at the same time. Since the ions interact through their mutual coulombic repulsion, the larger the number of ions present, the stronger their interaction. As a result, the storage efficiency for any particular mass depends in a non linear way on the total charge in the trap, and also depends on how that charge is distributed among the various masses. This means that the efficiency for storing a particular ion mass depends on the composition of the sample. This phenomenon is known as a matrix effect. For high precision work, matrix effects on the instrument response are very undesirable.

In the majority of the prior art techniques the space charge due to ions not of interest limits the capacity of the ion trap to store the ion mass of interest, resulting in a decreased dynamic range for measuring the amount of the ion of interest. In Dawson's method, the effects of space charge from ions not of interest is avoided by storing only one mass at a time. However, Dawson achieved the selection of the single ion of interest by operating the ion trap very near one of the coners of the ion stability diagram. This is known to result in a greatly reduced efficiency for trapping newly formed or injected ions.

SUMMARY OF THE INVENTION

It is therefore an object of the present invention to provide an improved method of operating a quadrupole ion trap mass spectrometer system for storing and analyzing ions with a single predetermined mass particularly useful for target analysis.

It is a further object of the present invention to provide an improved method of storing ions with a single predetermined mass having high efficiency and simplified operating procedure.

It is still another object of the present invention to provide a method of operating an ion trap as a mass spectrometer where each single ion mass is detected by adjusting a three-dimensional quadrupole storage field.

It is yet another object of the present invention to provide the improved method of storing selected ions with a predetermined single mass employing a simplified selected ion storage waveform technique where there is no requirement to recalculate the selected ion storage waveform for each mass of analyzed ions.

In accordance with the present invention a three-dimensional quadrupole storage field having a radio-frequency (RF) component, is developed within a trapping space bounded by a ring electrode and a pair of spaced apart end electrodes of an ion trap of the mass spectrometer system. Selection ions of interest with a single mass is provided by adjusting the three-dimensional quadrupole storage field. Each selected single mass of the ions of interest has a predetermined value of parameter $\beta_z$ of the ion trap. In operation a plurality of sample ions are introduced into a trapping space with the three-dimensional quadrupole storage field. A supplemental electric field having frequency components is established within the trapping space to resonantly eject the ions trapped within this trapping space except for ions having the predetermined value of the parameter $\beta_z$. The detection of the ions of interest having the selected single mass is provided by an ion detector. For monitoring the ions having another single mass the three-dimensional quadrupole storage field is changed. A value of parameter $\beta_z$ of another selected single mass is equal to the predetermined value of the parameter $\beta_z$.

BRIEF DESCRIPTION OF THE DRAWINGS

The accompanying drawings are incorporated in and constitute a part of the specification and serve to explain the principles of the invention.

DESCRIPTION OF THE PREFERRED EMBODIMENTS

Figure 1:
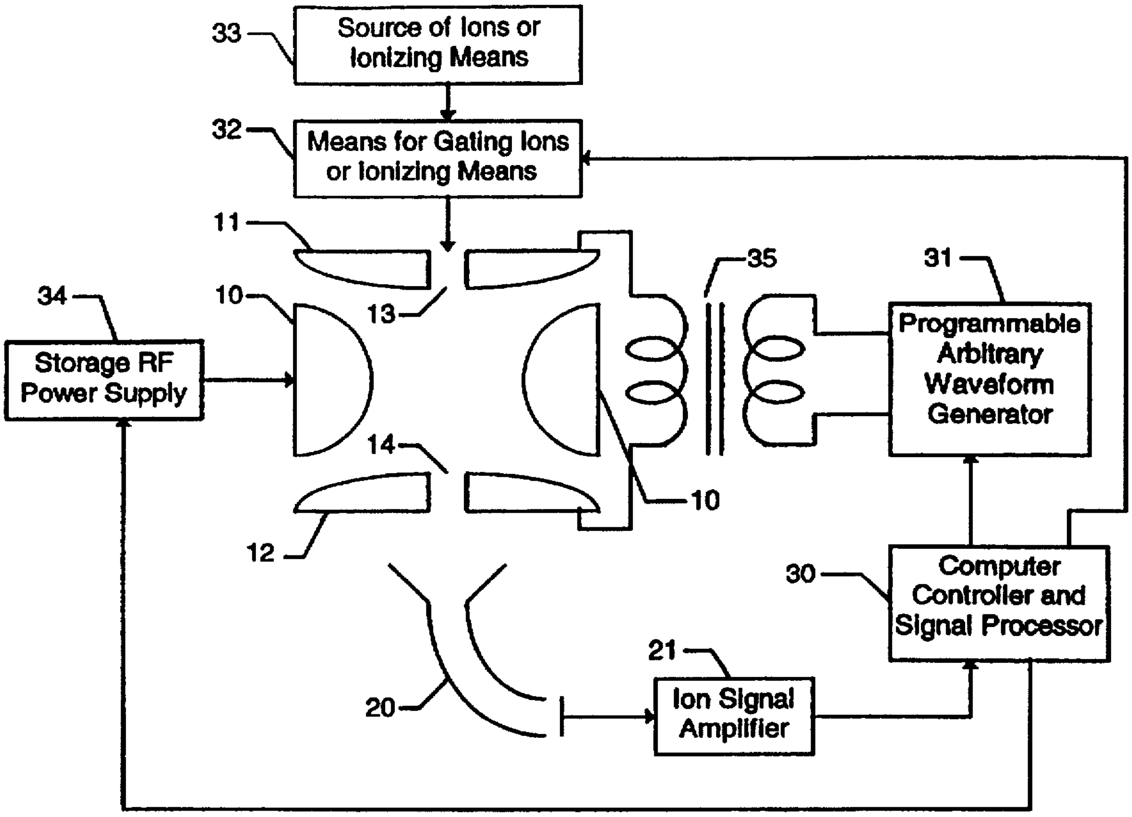
FIG. 1 is a schematic diagram of a conventional ion trap mass spectrometer.
Figure 2:
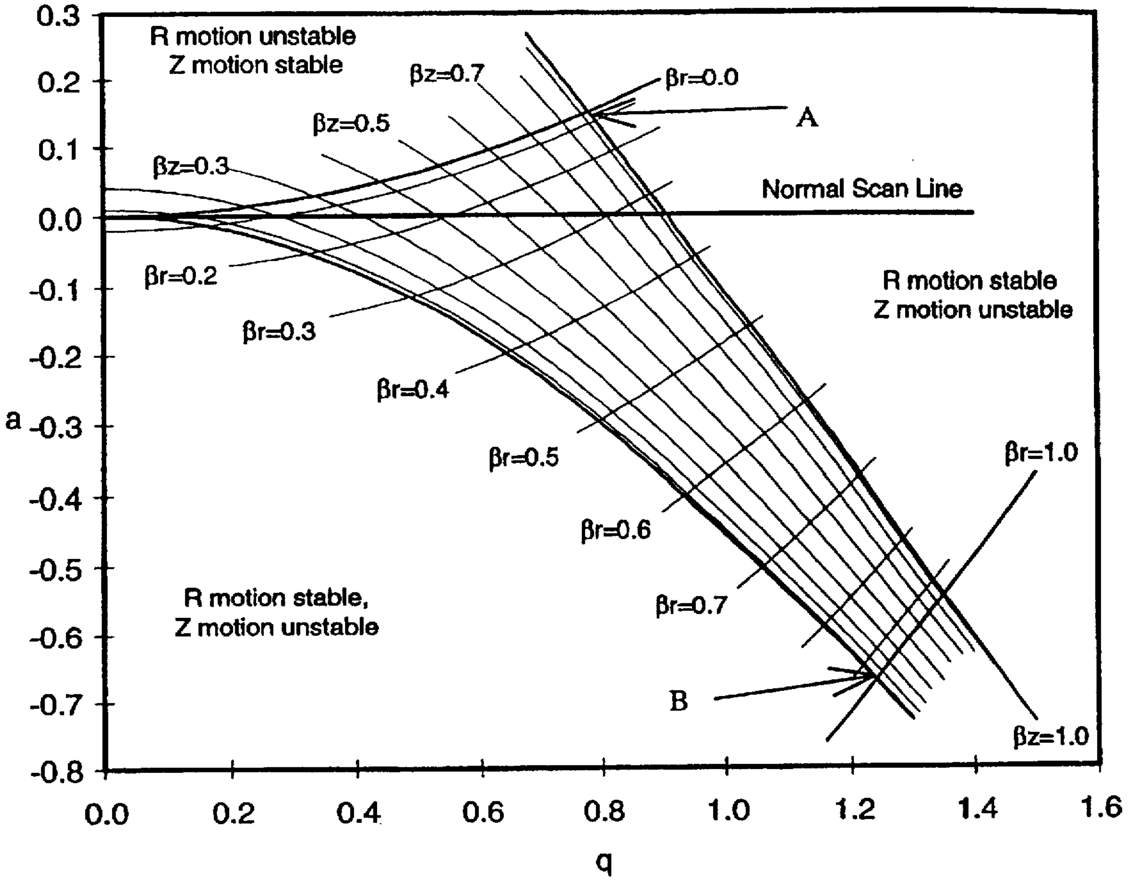
FIG. 2 is a stability diagram for the ion trap of FIG. 1.
Figure 3:
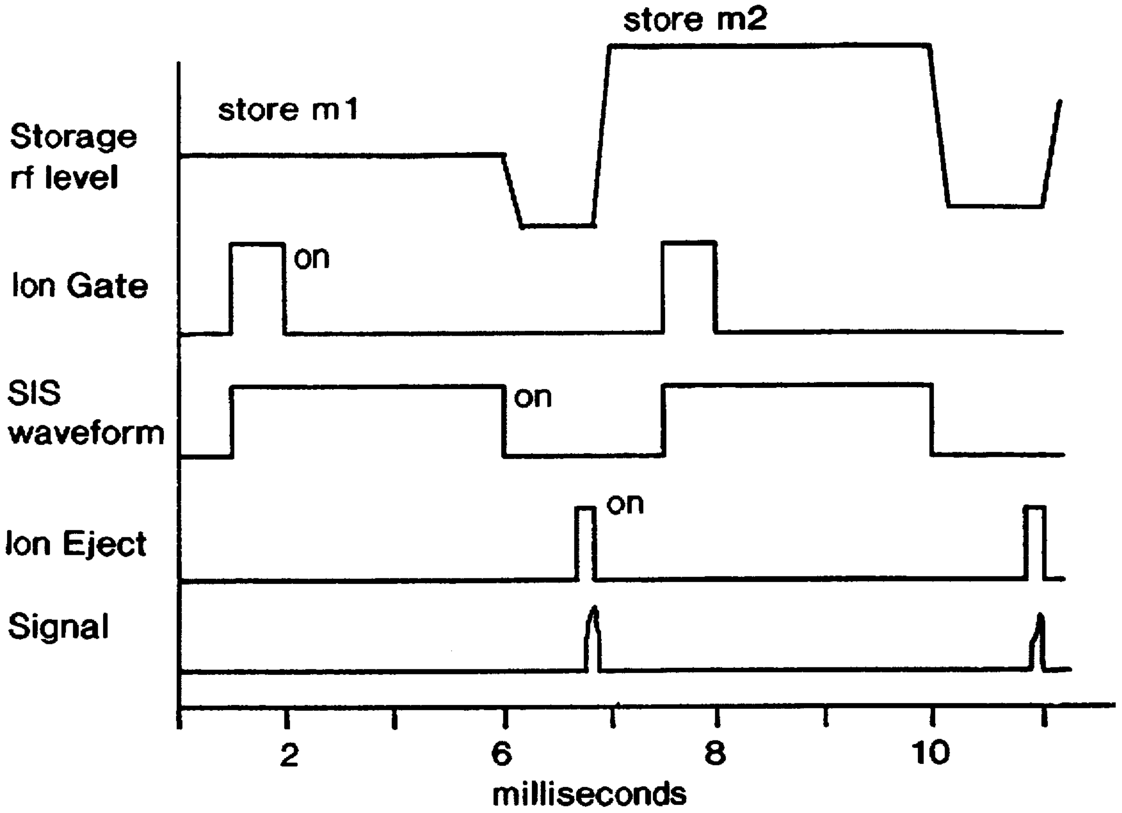
FIG. 3 is a scan function diagram for ion trap operations according to the present invention.

A mass spectrometer system with an ion trap provides precise and accurate measurements of ion abundances, if ions with a single selected mass are stored in the trap at a predetermined time, and if the conditions of storage are identical for any of the selected masses. Storage efficiency must be high in order to obtain the required sensitivity. These requirements are met by the method of operation of ion trap mass spectrometer system of the present invention shown schematically in FIG. 3.

For each single mass to be measured, the storage RF voltage is set to the value which corresponds to the selected, optimum $\beta$ value. According to the experiments utilizing the technique of the present invention, for most ions the values of $\beta$ in a range between 0.1 and 0.3 result in maximum storage efficiency. During the formation or injection of the ions and for a short period of time thereafter, waveform generator 31 is used together with transformer 35 to apply a broad band waveform to the end cap electrodes 11 and 12. This selected ion storage (SIS) waveform is constructed by numerically adding together frequency components to resonantly eject from the ion trap all masses with $\beta_z$ values other than the one selected $\beta_z$, value for the waveform.

The SIS waveform contains frequency components evenly distributed over the entire range of ion frequencies except for a single gap at the frequency corresponding to the value of $\beta_z$, at which it is desired to store ions. The SIS waveform may be generated and applied across end cap electrodes 11 and 12 of the ion trap using the hardware available on the Varian Saturn GC/MS.

Figure 4:
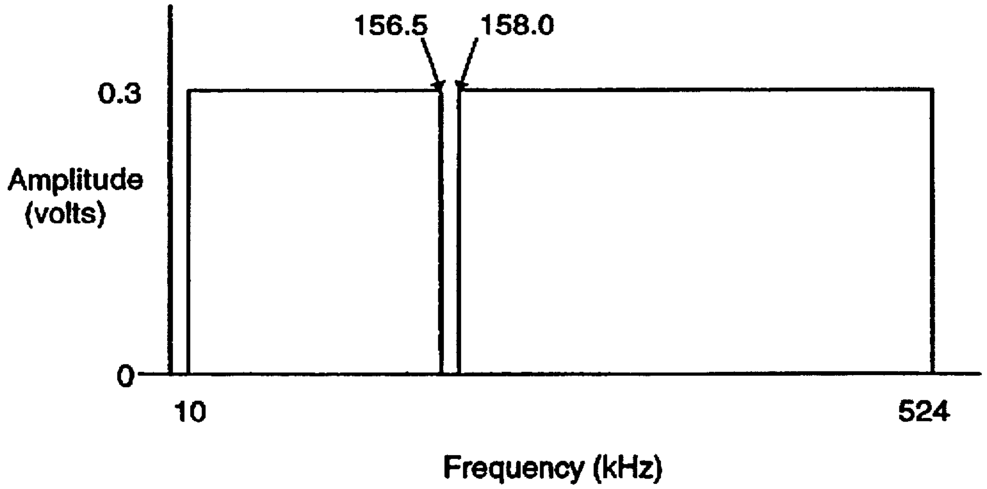
FIG. 4 is a graph showing the amplitude of the storage RF voltage as a function of frequency for a selected ion storage waveform.

In order to specify a waveform, it is necessary to specify the amplitudes, frequencies, and phases of each of its component frequencies. The SIS waveform preferably has amplitudes which are all approximately equal. The values of the waveform amplitudes as a function of time are stored in digital memory on the Varian Saturn GC/MS and clocked out to an analog-to-digital converter at a selected rate. A preferred embodiment waveform would consist of 5000 data values which would be clocked out at a rate of 2.5 million points per second. When the last data value is reached, the hardware returns to the first data value and continues sending out the data values so that the waveform is repeated cyclically. At this rate, the 5000 data points produce a waveform with a fundamental period of 2 milliseconds. It is known from the basic properties of periodic waveforms that the frequency components of such a waveform are all integral multiples of 500 Hz. The frequencies required to eject ions from the ion trap over the full range of stored masses extend within a range from 10 kHz up to 524 kHz. The high frequency limit is about one half of the frequency of the storage RF frequency, which in the Varian Saturn instruments is equal to 1048 kHz. The waveform includes frequencies at all multiples of 500 Hz from 10 kHz up to 524 kHz with the exception of a narrow window centered about the frequency corresponding to the desired storage $\beta_z$ value. For example, if it is desired to store ions at $\beta_z$=0.3 then the center of the frequency window is at 157.2 kHz. The frequency components at 157.0 kHz and 157.5 kHz would be omitted from the SIS waveform, as shown in FIG. 4, to allow ions with secular frequencies within this region to be stored. In a preferred embodiment waveform, the relative phases of the individual frequency components are randomized in order to prevent the occurrence of very large amplitudes in the composite waveform. An alternative method of choosing phases uses a non linear relationship between the frequency and the phase, for example $$\text{phase}=\text{constant}\times(\text{frequency})^2$$

The mass of the ion to be stored in the trap is determined by the three-dimensional quadrupole storage field in combination with the properties of the supplemental electric field waveform. With the waveform described above, ions with $\beta_z$=0.30 will be stored in the ion trap. In general $\beta_z$ is a complex function of both the RF and the DC components of the quadrupole storage field. However, for any fixed value of the DC amplitude, there is a unique value of $q_z$ which corresponds to any particular value $\beta_z$, and $q_z$ is a simple linear function of the amplitude V of the RF component of the quadrupole storage field; $q_z$ depends inversely on the mass of the selected ion. The desired mass may therefore be selected by adjusting the amplitude of the storage RF voltage to cause the desired ion mass to have the value $q_z$ which corresponds to the selected $\beta_z$ value of the supplemental waveform. For any fixed value of $\alpha_z$ for which the desired ion mass is trapped, the mass which is stored will be proportional to the amplitude of the storage RF voltage.

The ejection of the isolated ions into the detector is accomplished by applying a low frequency waveform across the end caps. This waveform is preferably a square wave with a frequency of about 1 kHz applied for only 1 ms (a single period of the waveform). This waveform can be produced by a set of 620 data values clocked out to the waveform digital to analog converter (DAC) at a rate of 625 thousand values per second. The first 310 data values would correspond to +50 volts on the end cap opposite the detector and −50 volts on the end cap near the detector. The effect would be to apply a total voltage drop of 100 volts across the ion trap to accelerate the trapped positive ions into the detector. The last 310 data points would correspond to reversing the above voltages, and might be omitted, depending on the elements of the electronic hardware.

In some situations, it may not be possible to isolate the selected ion mass to the degree desired using selected ion storage in the range of $\beta_z$ values which yield the best storage efficiency. Better mass resolution is possible in the resonant ejection process by operating at higher values of $\beta_z$ in the range of 0.6 to 0.9 where the secular frequencies of the trapped ions are higher. It is possible to further enhance the completeness of the isolation of a single mass by performing an additional step of resonant ion ejection of undesired ions at a higher $\beta_z$ value as suggested by the inventor of the present invention in the U.S. Pat. No. 5,300,772. A waveform for removing undesired ions which were not rejected by the first step of selected ion storage would have a frequency gap corresponding to $\beta_z$=0.7 which would be centered at 366.8 kHz. After the first step of ion isolation and accumulation, the source of ions would be turned off, and the RF storage level would be raised to bring the desired ion mass into the window of the second waveform, that is, to $\beta^z$=0.7. Then the second waveform would be turned on for 2–10 ms to eject the remaining undesired ions.

The frequency components required depend upon the selected value of $\beta_z$ at which the desired ion is stored in the ion trap. At the same time as unwanted ions are being ejected by resonant excitation, the desired ions are cooled by repeated collisions with the helium buffer gas normally present in the ion trap.

Following the storage in the ion trap of the ions of selected mass, the RF storage level is lowered to a value which still retains the cooled ions, but below the optimum for trapping newly formed or injected ions. A single cycle of a low frequency AC signal from programmable arbitrary waveform generator 31 is applied through transformer 35 across the end caps 11 and 12 This waveform is constructed so that ions are ejected through the opening 14 in lower end cap 12 into ion detector 20. For positive ions, this requires that the waveform begin with a positive voltage on the upper end cap 11 and a negative voltage on the lower end cap 12.

The signal from the selected ions is conditioned by ion signal amplifier 21 and stored by computer 30. Computer 30 then sets the storage RF supply 34 to store ions of the next mass to be measured and the sequence is repeated. It is not necessary for ions to be measured in any particular order.

In the preferred embodiment, the storage RF voltage is applied to the ring electrode of the ion trap, however, it is also possible to apply the storage RF voltage simultaneously to both end cap electrodes or differentially between the ring electrode and the end cap electrodes. The preferred embodiment of the present invention selectively stores the desired ion mass in a single step, yet other methods which perform multiple steps can also be used and are still within the spirit of the invention. Application of one of the methods of Wells (U.S. Pat. Nos. 5,396,064 or 5,198,665) or of Kelley (U.S. Pat. No. 5,134,286) or of Marshall et al. (U.S. Pat. No. 4,761,545) for creating a trapping field would also be within the spirit of the invention provided that the waveforms used did not need to be recomputed for each mass selected for measurement.

Although the voltage applied to the ion trap to eject the selected ions into the detector is furnished by the arbitrary waveform generator in the preferred embodiment, it is also possible to utilize a separate pulse generator attached to either or both of the end cap electrodes to provide the means to transfer ions from the ion trap into the ion detector. Also other means, including laser induced fluorescence, and non-destructive detection of the ion induced image currents, could be used to detect the selected ions. Other means could also be used to cause the ions to leave the ion trap for external detection.

The method of operating an ion trap of the present invention allows for adjusting the ionization time or ion accumulation time to bring the ion signal within the linear range of the ion detector and ion signal amplifier and digitizer. An additional measurement following the first one is required in which the ion signal measured in the first experiment is used to calculate the optimum accumulation time for the second measurement. This approach allows the dynamic range of the measurement to be greatly extended because the ion accumulation time may be accurately determined.

While operation at $\beta$ values between 0.1 and 0.3 results in maximum storage efficiency, it is also possible to operate at other $\beta$ values and still obtain the benefit of reproducible storage efficiency and simple operation. For example, when ions are trapped or formed at higher $\beta$ values, they experience more collisions and collisions of higher energy before they cool down and collect at the center of the quadrupole field. This promotes fragmentation of weakly bound ions and clusters and may be desirable for some measurements. Also the mass resolution of the resonant ion ejection process increases with increasing $\beta$ value, and it may be desirable in some situations to operate at reduced sensitivity in order to obtain better selectivity in the mass to be measured.

There are certain tasks such as target analysis when the need for precise and accurate measurement of the amounts of ions of different masses is more important than the speed of the measurement. Examples include measurements of the ratios of the amounts of the various isotopes of specific elements used in isotopic labeling or tracer experiments, or measurements of the composition of mixtures where the composition does not change rapidly with time, such as in residual gas analysis in vacuum systems or the testing of gases for impurities.

The new method of operating the ion trap mass spectrometer system is very convenient in its implementation because the supplemental waveform (or waveforms) need only be constructed once. The computer which operates the measurement system need not have the capability of calculating the waveform data. The software running controller and signal processor computer 30 could be permanently stored in read-only memory and the system could function as a black box which returns a number proportional to the amount of an ion of specified mass whenever a numerical mass value is sent to the instrument. This would provide a very simple interface between a mass spectrometer operating according to this invention and a human operator or a computer.

The method of operating the ion trap mass spectrometer system of the present invention avoids the complications and non linear responses of the ion trap caused by the interaction of clouds of ions of different masses as described above.

While the method described herein constitutes preferred embodiments of the invention, it is to be understood that the invention is not limited to these precise embodiments, and that changes may be made therein without departing from the scope of the invention which is defined in the appended claims.

What is claimed is:

1. An improved method of operating an ion trap mass spectrometer system comprising the steps of:

(a) developing a three-dimensional quadrupole storage field within a trapping space bounded by a ring electrode and a pair of spaced apart end electrodes of an ion trap of said mass spectrometer system, said storage field having a radio-frequency (RF) component;

(b) selecting ions having a single mass to be monitored by adjusting said three-dimensional quadrupole storage field, wherein said selected single mass has a predetermined value of parameter $\beta_z$;

(c) providing a plurality of sample ions within said three-dimensional quadrupole storage field;

(d) providing a supplemental electric field having frequency components within said trapping space to resonantly eject the ions trapped within said trapping space except for ions having said predetermined value of said parameter $\beta_z$;

(e) detecting the ions trapped within said trapping space after the step (d);

(f) changing said three-dimensional quadrupole storage field for selecting the ions having another single mass to be monitored, a value of parameter $\beta_z$ of said another single mass being equal to said predetermined value of said parameter $\beta_z$; and (g) after step (f) repeating steps (c) through (e).

2. The improved method of operating an ion trap mass spectrometer system of claim 1, wherein the step (a) comprises applying a storage RF voltage to said ring electrode.

3. The improved method of operating an ion trap mass spectrometer system of claim 2, wherein the step (b) comprises adjusting an amplitude of said storage RF voltage.

4. The improved method of operating an ion trap mass spectrometer system of claim 3, wherein the step (d) comprises applying a supplemental RF voltage across said pair of spaced apart end electrodes.

5. The improved method of operating an ion trap mass spectrometer system of claim 4, wherein the step (e) comprises applying a pulsed voltage to at least one of said electrodes to cause the ions to be incident on an ion detector.

6. The improved method of operating an ion trap mass spectrometer system of claim 2, wherein the step (d) further comprising a step of applying a first broadband spectrum RF waveform during an ionization time of said ions within said trapping space, said first broadband spectrum RF waveform having a frequency spectrum which excludes a first range of frequencies corresponding to said selected single mass of said ions.

7. The improved method of operating an ion trap mass spectrometer system of claim 6, wherein said first range of frequencies corresponds to a value of said parameter $\beta_z$ in a range between about 0.1 and 0.3.

8. The improved method of operating an ion trap mass spectrometer system of claim 7, wherein said second range of frequencies corresponds to the value of said parameter $\beta_z$ in a range between about 0.7 and 0.85.

9. The improved method of operating an ion trap mass spectrometer system of claim 6, wherein said step of providing said selected RF voltage further comprising a step of applying a second broadband spectrum RF waveform after said ionization time, said second broadband spectrum RF waveform having a frequency spectrum which excludes a second range of frequencies corresponding to said selected single mass of said ions, wherein said second range of frequencies is substantially narrower than said first range of frequencies.

10. The improved method of operating an ion trap mass spectrometer system of claim 8, wherein said second range of frequencies is up to 1% of the frequency spectrum of said second broadband spectrum RF waveform.

11. An improved method of monitoring ions of a selected single mass within an ion trap defining a trapping space by a ring electrode and a pair of spaced apart end cap electrodes, the improved method comprising the steps of:

(a) providing a three-dimensional storage field within said trapping space for trapping ions having a plurality of masses;

(b) adjusting said three-dimensional storage field for each selected single mass to be monitored so that each said selected single mass has a fixed selected value of a parameter $\beta_z$;

(c) providing sample ions having a plurality of masses within said trapping field;

(d) establishing a supplemental RF field within said trapping space for ejecting ions having non selected masses by applying a predetermined broadband spectrum RF waveform which excludes a range of frequencies corresponding to said selected single mass; and (e) after step (d) detecting the ions trapped within said trapping space.

12. The improved method of storing ions of a selected single mass within an ion trap of claim 11, wherein said storage field is produced by applying an electrical voltage to said ring electrode.

13. The improved method of storing ions of a selected single mass within an ion trap of claim 12, wherein said selected supplemental RF voltage is applied to at least one of said spaced apart end cap electrodes.

14. The improved method of storing ions of a selected single mass within an ion trap of claim 12, wherein said selected supplemental RF voltage is applied to said ring electrode.

15. An improved method of monitoring ions of a selected single mass within an ion trap defining a trapping space by a ring electrode and a pair of spaced apart end cap electrodes, the improved method comprising the steps of:

(a) providing a three-dimensional storage field within said trapping space for trapping ions having a plurality of masses;

(b) adjusting said three-dimensional storage field for each selected single mass to be monitored so that each said selected single mass has a selected value of a parameter $\beta_z$;

(c) providing sample ions having a plurality of masses within said trapping space;

(d) establishing a supplemental RF field within said trapping space for ejecting ions having non selected masses by:

applying a first broadband spectrum RF waveform which excludes a first range of frequencies corresponding to said selected single mass; and applying a second broadband spectrum RF waveform which excludes a second range of frequencies corresponding to said selected single mass, wherein said second range of frequencies is narrower than said first range of frequencies; and (e) after step (d) detecting the ions trapped within said trapping space.

16. The improved method of monitoring ions of a selected single mass within an ion trap of claim 15, wherein the step (d) further comprising a step of changing the three-dimensional storage field for increasing the value of said parameter $\beta_z$ after applying a first broadband spectrum RF waveform.

* * * * *